No. 895,269. PATENTED AUG. 4, 1908.
C. F. HUNTOON.
BRAKE BEAM.
APPLICATION FILED APR. 4, 1908.
2 SHEETS—SHEET 1.
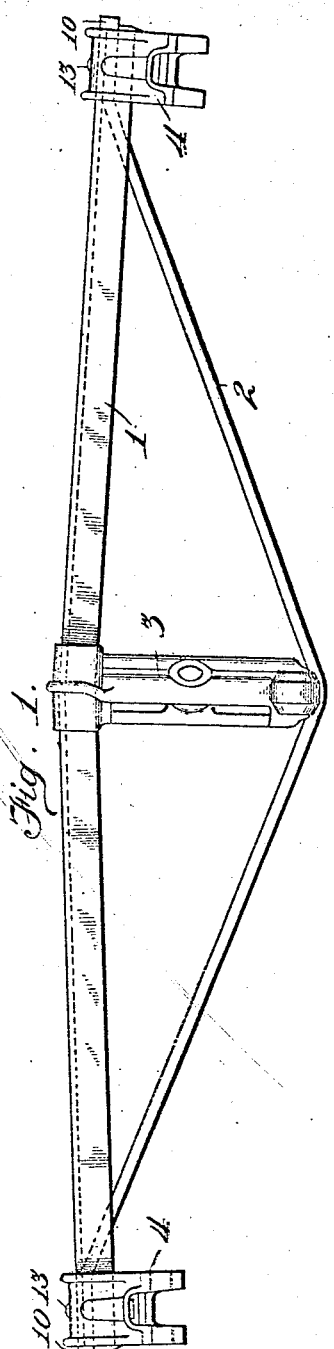
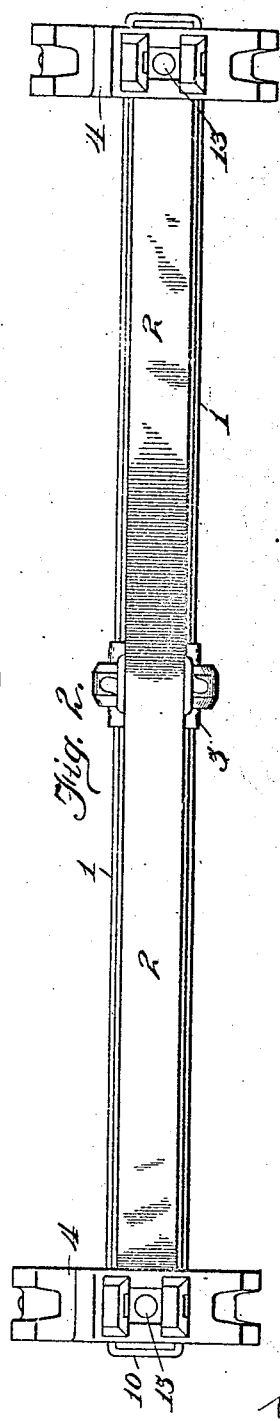
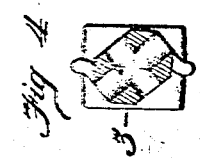
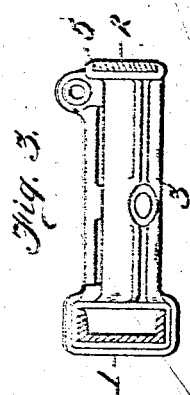
Witnesses
Inventor,
Charles F. Huntoon
by Albert H. Graves
Attorney No. 895,269. PATENTED AUG. 4, 1908.
C. F. HUNTOON.
BRAKE BEAM.
APPLICATION FILED APR. 4, 1908.
2 SHEETS—SHEET 2.
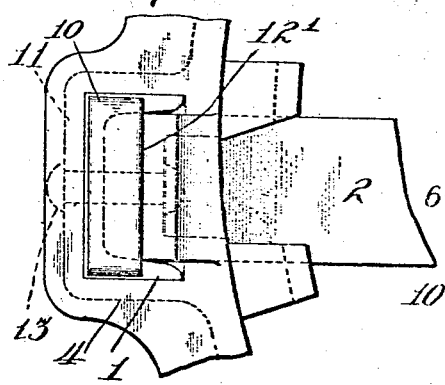
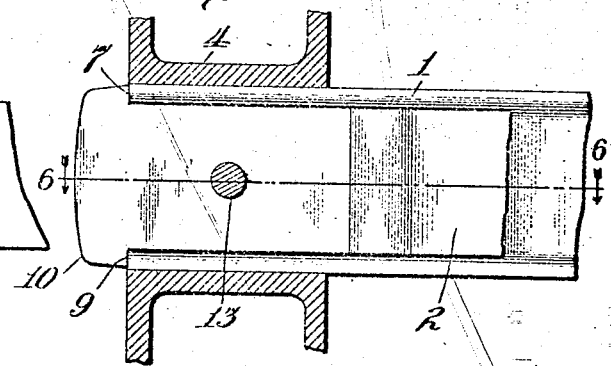
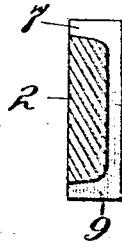
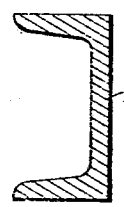
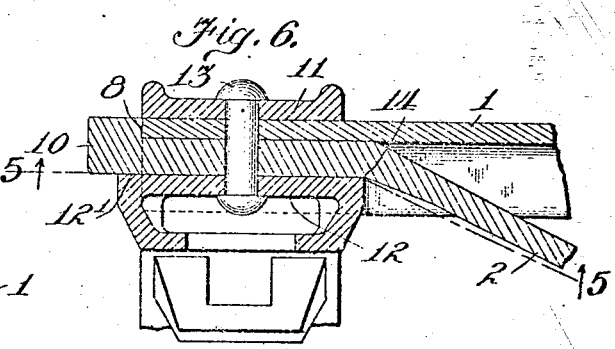
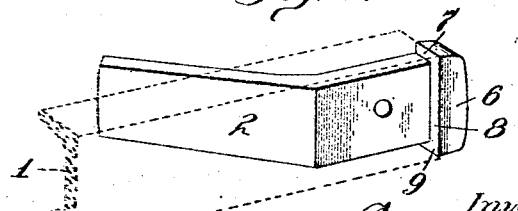

UNITED STATES PATENT OFFICE.

CHARLES FRANCIS HUNTOON, OF CHICAGO, ILLINOIS.

BRAKE-BEAM.

No. 895,269.

Specification of Letters Patent.

Patented Aug. 4, 1908.

Application filed April 4, 1908. Serial No. 425,134.

*To all whom it may concern:*

Be it known that I, CHARLES FRANCIS HUNTOON, a citizen of the United States, residing at Chicago, in the county of Cook and State of Illinois, have invented a certain new and useful Improvement in Brake-Beams, of which the following is a specification.

This invention relates to improvements in brake beams, and it has for its salient objects to provide a construction in which the connections between the tension and compression members are such as to secure maximum strength combined with great simplicity of form; to provide a construction in which a tension member of strap-like cross sectional form (so far as its terminal portions are concerned) may be combined with a flanged compression member in such manner as to provide a brake beam, the ends of which are extremely thin for a given degree of strength and in this respect economize space at points where comparatively little space is available; to provide a construction in which endwise movement of the ends of the tension member upon the compression member is resisted by forged shoulders which abut directly against the end margins of the flanged member in such manner as to distribute such stresses over the chief portion of the cross sectional area of the compression member; to provide a construction which lends itself to being assembled with the greatest facility, and the two main members of which when assembled hold themselves locked together independently of special fastenings; to provide a construction which enables the terminal portions of the compression member to be made specially strong, and to that end somewhat heavier than the remainder of the member, in a simple and practical manner; and in general to provide an improved construction of the character referred to.

In the drawings—Figure 1 is a plan view of a brake beam embodying a preferred form of my invention; Fig. 2 is a front elevation of the same; Figs. 3 and 4 are details of the strut member of the beam; Fig. 5 is a sectional view of a fragmentary portion of one end of the beam taken on line 5—5 of Fig. 6 and showing the inner or front side of the flange compression member and the terminal portion of the tension member lying therein; Fig. 6 is a horizontal sectional view taken on line 6—6 of Fig. 5 and looking downwardly; Fig. 7 is an end elevation of the beam and the brake shoe head thereon, parts of the latter not concerned in the present invention being broken away; Fig. 8 is a perspective view of one end of the tension member; Fig. 9 is a cross sectional view taken through one end of the compression member and looking towards the headed end thereof; Fig. 10 is a cross sectional view of the flanged compression member which receives the ends of the tension member.

In the drawings, 1 designates as a whole the flanged compression member, 2 the tension member, 3 the strut member, and 4, 4 the brake shoe heads mounted upon the respective ends of the beam.

In the preferred construction shown, the flanged member 1 is of channel shape in cross section, arranged with its bottom side or main web vertical and at the rear, with reference to the direction on which the draft comes on the beam, and slightly cambered or bent, as shown clearly in Fig. 1. The compression member 2 preferably takes the form of a flat strap-like bar engaging at its center a suitable seat 5 in the front end of the strut member and extending thence to and secured to the respective ends of the compression member.

The end portions of the tension member are, as shown clearly in the detailed figures, made of a width and cross sectional form approximately corresponding to the bottom portion of the channel member, and said end portions are bent so as to lie flatwise within the ends of the channel member for a length corresponding to the width of the brake shoe head. Each end of the tension member terminates in a headed portion 6 so forged upon said member as to provide outstanding shoulders 7, 8 and 9 on three sides, corresponding to and adapted to fit squarely against the corresponding end portions of the compression member. The lateral width of the shoulders 7, 8 and 9 correspond substantially to the thickness of the corresponding portions of the compression member against which they abut, so that when the tension member is in place in the compression member it has full bearing against the ends of the latter but nevertheless permits the brake shoe heads to be slipped on the ends of the beam without requiring a larger aperture in the heads than that necessary to accommodate the compression member alone. The compression member and tension member are preferably assembled under tension. That is to say, the cambered compression member is flexed very slightly beyond its normal so as to permit the headed ends of the tension member to engage with the ends of the channel and thereafter remain under a slight tension. To insure that this slight tension will hold the parts against separation temporarily, pending the placing of the brake shoe head thereon and securing it in place, or at any time when it is found necessary to remove one or the other of the brake shoe heads, I prefer to make the shoulder 8 of the headed end of the compression member very slightly undercut or hooked, as shown in somewhat exaggerated form at 8 in Fig. 6.

The brake shoe head 4 is provided with a transverse socket or opening 10 which receives the end of the brake beam, the back side of the head 11 being arranged to lie flat against the back side of the channel or compression member, and the front wall 12 of the brake shoe head taking the form of an inset lug which extends into the front side of the channel and rests against the front face of the tension member, as seen clearly in Figs. 6 and 7. A suitable rivet 13 is inserted through the assembled parts to hold them in assembled relation.

It will be noted that those parts of the tension member which lie within the brake shoe heads are made somewhat thicker than the main body of the bar. There is a two-fold object in this construction, viz: to provide a greater cross sectional strength at the point where the shearing stress between the end of the compression member and the head of the tension member occurs and to provide greater strength at the angle 14 where the tension member departs from the compression member and draws across the corner, so to speak, of the brake shoe head. It is also to be noted that the increased thickness of the end portions of the tension member renders the latter as strong at the point where the rivet aperture intersects it as in any other part of its length.

It is a matter of much importance that a brake beam shall be so constructed that it not only has sufficient strength to withstand the maximum stresses to which it will be subjected but that it shall stand these enormous stresses when accompanied or caused by repeated shocks and blows. That is to say, the blows on the structure tend to disfigure and batter the parts which come into engagement with each other and receive the stress of these blows, and it will be seen that the present construction admirably meets the conditions necessary to withstand such severe duty.

It is to be noted that the width of the front wall or portion 12 of the brake shoe head which lies against the front face of the tension member is of such width as to extend outside of a point transversely opposite the end face of the compression member, as indicated at 12'. This construction prevents any tendency which might exist when the beam was subjected to a stress approaching destruction of the headed portion to bend forwardly, and thus permit the tension member as a whole to yield, and it will be noted in this connection that the area of engagement of the shoulders of the headed portions with the corresponding end faces of the flanged member exceeds in shearing value the tensile or cross sectional strength of the tension member at the points where these shearing stresses are greatest.

Another feature of advantage of the construction described is that the ends of the tension members lie within the flanged member and against the vertical web of the latter, so that the endwise or compression stresses are brought upon the compression member precisely in that plane in which its greatest strength to resist such stresses lies, and in this respect the construction is distinguished from those constructions in which filling blocks are interposed between the ends of the tension member and compression member, or in which the construction is such that the ends of the tension member are set some distance in front of the main web of the compression member, and hence convert the compression stresses into leverage stresses tending to buckle or camber the compression member as a whole.

Another feature of the present construction which is important is that the engagement between the tension member and the compression member by means of which the stresses are conveyed from one to the other is a direct contact engagement without the interposition of filling blocks or analogous members. In other words, there is but a single joint between these two parts. When it is considered that each joint inevitably produces a certain amount of lost motion under the enormous stresses to which these devices are subjected, and when it is further considered that the total deflection permissible at the center of the beam under maximum load is $\frac{1}{16}$ of an inch under the M. C. B. requirements, the importance of this feature becomes apparent.

It will be obvious that the details of construction and arrangement may be somewhat modified without departing from the spirit of the invention.

I claim as my invention:

1. In a trussed brake beam, the combination with a flanged compression member, of a tension member having its end portions brought alongside the web and flange portions of the compression member and shouldered to overlap and engage with the end surfaces of both the web and flange portions of the compression member, and means clamping said members together at their ends.

2. In a trussed brake beam the combination of a compression member having a vertical web and a forwardly directed flange, a tension member having its end portions brought alongside of the web and flange of said compression member and provided with terminal heads, the shoulders whereof overlap and engage the end surfaces of both the web and flange of the compression member, and means clamping said members together at their said ends.

3. In a trussed brake beam, the combination with a flanged compression member of channel-shape in cross section, of a tension member having end portions approximately conforming to and lying within the end portions of said compression member and provided at its ends with terminal heads laterally enlarged on three sides to overlap and engage the end surfaces of the channel web and the two flanges thereof, and a brake shoe head mounted upon each end of the brake beam and united thereto to clamp the compression and tension members together.

4. In a trussed brake beam, the combination with a flanged compression member having a vertical web and upper and lower forwardly projecting marginal flanges, of a tension member or truss having strap-like end portions brought alongside of and in contact with the face of the web and between the flanges of the compression member and provided with terminal heads enlarged to form laterally extending approximately right-angled shoulders arranged to overlap and directly engage the end surfaces of the web and the said flanges of the compression member, a brake shoe head apertured and fitted upon each end of the brake beam and having front and rear walls embracing the juxtaposed parts of the compression and tension members, and means confining each brake shoe head against endwise movement upon the beam.

5. In a trussed brake beam, the combination of a compression member having a vertical web and one or more forwardly directed flanges upon said web, a tension member having its end portions brought alongside of the web and flange or flanges of said compression member and provided with terminal heads, the shoulders whereof overlap and engage the end surfaces of both the web and flange or flanges of the compression member, and means clamping said members together at their ends comprising a clamping member at each end arranged to rest directly against the front face or surface of the juxtaposed beam members and extending at its outer edge beyond the end surface of the compression member against which the shoulders of the tension member engage.

CHARLES FRANCIS HUNTOON.

Witnesses:
ALBERT H. GRAVES,
EMILIE ROSE.